US 6,661,950 B1

(12) United States Patent
Strecker (10) Patent No.: US 6,661,950 B1
(45) Date of Patent: Dec. 9, 2003

(54) MICRORESONATOR-BASED TUNED OPTICAL FILTER

(75) Inventor: Brian N. Strecker, Stillwater, OK (US)

(73) Assignee: Nomadics, Inc., Stillwater, OK (US)

( * ) Notice: Subject to any disclaimer, the term of this patent is extended or adjusted under 35 U.S.C. 154(b) by 30 days.

(21) Appl. No.: 10/043,961

(22) Filed: Jan. 10, 2002

Related U.S. Application Data (60) Provisional application No. 60/260,754, filed on Jan. 10, 2001.

(51) Int. Cl.$^7$ .................................................. G02B 6/26
(52) U.S. Cl. .............................. 385/30; 385/39; 385/27; 385/24; 385/16; 385/14
(58) Field of Search ............................ 385/17, 15, 14, 385/27, 28, 30, 32, 39, 40, 48, 50

(56) References Cited

U.S. PATENT DOCUMENTS

| | | | |
|---|---|---|---|
| 3,697,182 A | 10/1972 | Erickson et al. | |
| 4,720,160 A | 1/1988 | Hicks, Jr. | |
| 4,999,013 A | 3/1991 | Zoechbauer et al. | |
| 5,059,026 A | 10/1991 | Zoechbauer | |
| 5,073,004 A | 12/1991 | Clayton et al. | |
| 5,408,319 A | 4/1995 | Halbout et al. | |
| 5,550,373 A | 8/1996 | Cole et al. | |
| 6,052,495 A | 4/2000 | Little et al. | |
| 6,078,605 A | 6/2000 | Little et al. | |
| 6,101,300 A | 8/2000 | Fan et al. | |
| 6,125,220 A | 9/2000 | Copner et al. | |
| 6,130,969 A | 10/2000 | Villeneuve et al. | |
| 6,195,187 B1 | 2/2001 | Soref et al. | |
| 6,281,977 B1 | 8/2001 | Paiam et al. | |
| 6,411,752 B1 * | 6/2002 | Little et al. | ............ 385/17 |
| 2002/0039470 A1 * | 4/2002 | Braun et al. | ............ 385/50 |
| 2002/0079453 A1 * | 6/2002 | Tapalian et al. | ............ 250/343 |
| 2002/0094150 A1 * | 7/2002 | Lim et al. | ............ 385/15 |
| 2002/0097401 A1 * | 7/2002 | Maleki et al. | ............ 356/436 |

FOREIGN PATENT DOCUMENTS

JP 2000298215 A * 10/2000 ............ G02B/6/12

OTHER PUBLICATIONS

Von Klitzing, Wolf Optics Letters, Feb. 1, 2001. pp. 166–168, vol. 26, No. 3.
Miniature Optoelectronics Oscillators Based on Microspheres. Photonics Tech Briefs. Sep. 2001, pp. 18a–19a.
Ilchenko, Vladimir S. Microtorus: a high–finesse microcavity with whispering–gallery modes. Optics Letters, Mar. 1, 2001. pp. 256–258, vol. 26, No. 5.
Ilchenko, V.S. Strain–tunable high–Q optical microshpere resonator. Optics Communications. Jan. 1998, pp. 86–90.
Knight, J.C. Phase–matched excitation of whispering–gallery mode resonances by a fiber taper. Optics Letters, Aug. 1, 1997. pp. 1129–1131, vol. 22, No. 15.
Cai, Ming. Fiber–Optic Add–Drop Device Based on a Silica Microsphere–Whispering Gallery Mode System. IEEE Photonics Technology Letters, Jun. 1999. vol. 11, No. 6.
Chu, Sai T. An Eight–Channel Add–Drop Filter Using Vertically Coupled Microring Resonators. IEEE Photonics Technology Letters, Jun. 1999. pp. 691–693 vol. 11, No. 6.

(List continued on next page.)

Primary Examiner—Hemang Sanghavi
Assistant Examiner—Scott Knauss
(74) Attorney, Agent, or Firm—Dunlap, Codding & Rogers, P.C.

(57) ABSTRACT

A novel tuned coupled-microresonator filter with a known transfer function. This transfer function may be used, along with the filter's output signal, to extract the original input signal. The quality factor of manufacturable microresonators typically exceeds $10^6$ and permits the attainment of exceptionally high resolution in a small, physically-rugged, environmentally-protected package. In addition, the properties of the resonator and coupling optics lend themselves to low cost production.

15 Claims, 5 Drawing Sheets

OTHER PUBLICATIONS

Dimmick, Timothy E. Carbon dioxide laser fabrication of fused–fiber couplers and tapers. Applied Optics. Nov. 20, 1999. pp. 6845–6848. vol. 38, No. 33.

Artemyev, Mikhail V. Light Trapped in a Photonic Dot: Microspheres Act as a Cavity for Quantum Dot Emission, Nano Letters, Apr. 29, 2001. pp. 309–314. vol. 1, No.

Little, B.E. Vertically Coupled Glass Microring Resonator Channel Dropping Filters. IEEE Photonics Technology Letters, Feb. 1999. pp. 215–217. vol. 11, No. 2.

Ilchenko, Vladimir S. Pigtailing the high–Q microsphere cavity: a simple fiber coupler for optical whispering–gallery modes. Optics Letters, Jun. 1 1999. pp. 723–725, vol. 24, No. 11.

Maleki, Lutfollah. Whispering–Gallery–Mode Microspheres as light modulators. NASA Tech Brief. Nov. 00, pp. i, 1, 1a–6a. vol. 24, No. 11.

Balistreri, M.L.M. Experimental analysis of the whispering–gallery modes in a cylindrical optical microcavity. J. Opt. Soc. Am. Apr. 2001. pp. 465–471. vol. 18, No. 4.

Cai, Ming. Highly efficient hybrid fiber taper coupled microsphere laser. Optics Letters, Jun. 15, 2001. pp. 884–886. vol. 26, No. 12.

Grover, R. Vertically coupled GaInAsP–InP microring resonators. Optics Letters, Apr. 15, 2001. pp. 506–508. vol. 26, No. 8.

Inui, T. Highly efficient tunable fiber bragg grating filters using multilayer piezoelectric transducers. Optics Communications, Apr. 1, 2001. pp. 1–4. vol. 190.

Ishikawa, H. Optical coupling between a microresonator and an adjacent dielectric structure. J. Opt. Soc. Am. B, Jun. 2001. pp. 762–769. vol. 18, No. 6.

Maleki, Lutfollah, Surface Gratings for Optical Coupling with Microspheres. NASA Tech Brief. May 1, 2001. pp. i–ii, 1–3. vol. 25, No. 5.

Maleki, Lutfollah. Simple Fiber–Optic Coupling for Microsphere Resonators. NASA Tech Brief. May 1, 2001. pp. 1, 1a–5a. vol. 25, No. 5.

Maleki, Lutfollah. Highly Oblate Microspheroid as an Optical Resonator. NASA Tech Brief. Apr. 1, 2001. pp. i, 1, 1a–3a. vol. 25, No. 4.

Cai, Ming. Highly efficient optical power transfer to whispering –gallery modes by use of a symmetrical dual–coupling configuration. Optics Letters, Feb. 15, 2000. pp. 260–262. vol. 25, No. 4.

Laine, J.–P. Planar integrated wavelength–drop device based on pedestal antiresonant reflecting waveguidesd and high–Q silica microspheres. Optics Letters, Nov. 15, 2000. pp. 1636–1638. vol. 25, No. 22.

Maleki, Lutfollah. Microsphere and Microcavity Optical–Absorption Sensors. NASA Tech Brief. Apr. 1, 2001. pp. i–ii, 1, 1a–4a. vol. 25. No. 4.

Melloni, Andrea. Synthesis of a parallel–coupled ring resonator filter. Optics Letters, Jun. 15, 2001. pp. 917–919. vol. 26, No. 12.

Shima, K. High–Q concentrated directional emission from egg–shaped asymmetrical resonant cavities. Optics Letters, Jun. 1, 2001. pp. 795–797. vol. 26, No. 11.

Wallace, John. Microcavity Resonators: Microtorus has large free spectral range. Laser Focus World. May 2001, pp. 68–70. Pennwell Publishing Co: Tulsa.

Suzuki, Shuichi. Ultrashort Optical Pulse Transmission Characteristics of Vertically Coupled Microring Resonator Add/Drop Filter. Journal of Lightwave Technology, Feb. 2001. pp 266–271. vol. 19, No. 2.

* cited by examiner

MICRORESONATOR-BASED TUNED OPTICAL FILTER

CROSS-REFERENCE TO RELATED APPLICATIONS

The present patent application claims priority to the provisional patent application identified by U.S. Serial No. 60/260,754, filed Jan. 10, 2001, the entire content of which is hereby expressly incorporated herein by reference.

STATEMENT REGARDING FEDERALLY SPONSORED RESEARCH OR DEVELOPMENT

Not Applicable.

BACKGROUND OF THE INVENTION

Traditional systems for characterizing the spectral composition of an optical signal rely upon macro-scale components, or micro-scale versions of such components, that divide the component wavelengths of the input into a spatially or temporally separated output. Spatially-swept systems typically contain a diffractive element, such as a prism or diffraction grating, which may be fixed or rotated. In a fixed configuration, the spatial distribution of the optical output is monitored by an array of detectors. In the rotated configuration, the diffractive element is rotated to sweep the optical output across a single detector. Temporally-swept systems typically incorporate a resonant structure with a finite number of reflective surfaces or structures. The resonator selectively passes or blocks a narrow band of the input spectrum. This band is swept by altering the dimensions of the resonator to produce a temporally-swept output that is monitored by a single detector. Variations on these two themes, such as Fizeau interferometers, exist which incorporate features of both basic approaches.

DETAILED DESCRIPTION OF THE INVENTION

Figure 1:
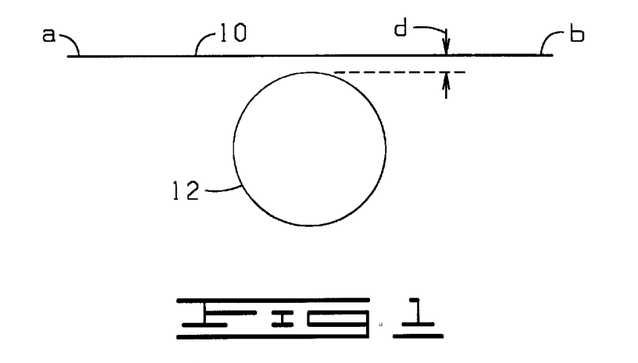
FIG. 1 is a diagrammatic view of a microresonator positioned in close proximity to an input optical waveguide in accordance with the present invention.

FIG. 1 illustrates an example implementation of the present invention for the purpose of explaining the physical phenomena upon which the present invention is based. In FIG. 1, a length of first waveguide 10 conducts an optical signal from point a to point b. The first waveguide 10 can be a fiber optic cable or prisms, for example. The electromagnetic field of the optical signal extends beyond the first waveguide 10 and interacts with a microresonator 12. The microresonator 12 can be constructed of an optically conducting material, such as silica.

Certain wavelengths of light are resonant with whispering gallery modes (WGMs) that are supported by the microresonator 12. These wavelengths couple out of the first waveguide 10 and into the microresonator 12, so that the wavelengths are attenuated in the optical signal at point b. In other words, the first waveguide 10 is evanescently coupled to the microresonator 12 such that supported whispering gallery mode resonance frequencies are extracted from the first waveguide 10 and received into the microresonator 12 while light at frequencies not resonant with the microresonator 12 remain within the first waveguide 10. This reduces the total optical energy passing point b and may be detected using a detector 14 (FIG. 2), such as standard optical detectors. This effect occurs for a range of spacings (d) between the first waveguide 10 and the microresonator 12, including contact. Changes in the microresonator's 12 environment (e.g., temperature, compression, electric field, etc.) alter its refractive index and the wavelengths of its supported WGMs. Such a coupled-microresonator system acts as a filter with a wavelength and environment dependent transfer function, $H(\lambda, T)$. The current invention includes a tuned optical filter (TOF) 16 incorporating these effects. When attached to a data collection and analysis system 18, FIG. 2, the tuned optical filter 16 provides a means of extracting the original input signal spectrum with high resolution.

Figure 10:
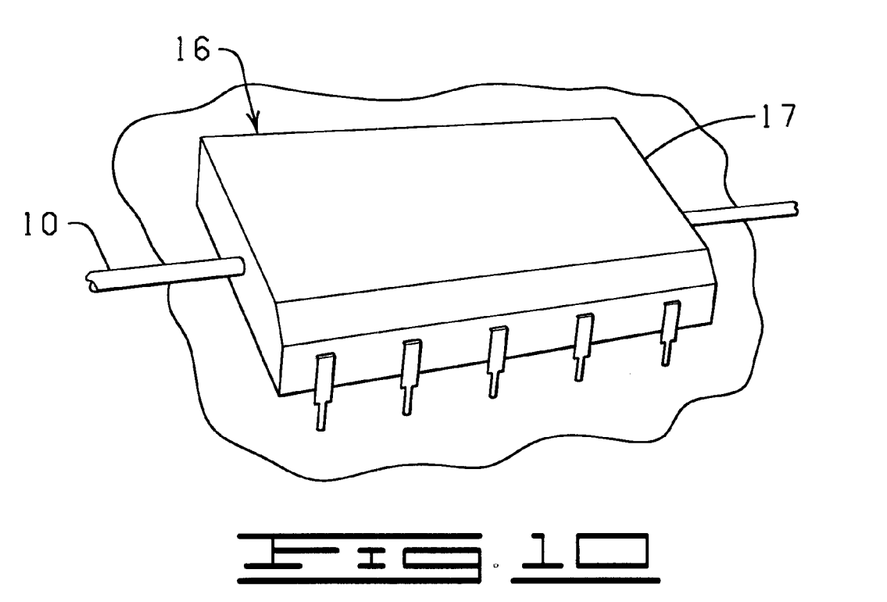
FIG. 10 is a perspective view of one version of the present invention.

The tuned optical filter 16 includes a housing 17 (see FIG. 10) encasing the microresonator 12 and a portion of the first waveguide 10 transmitting the optical signal for preventing optically absorptive or scattering materials, such as dust or gasses, from interacting with light in the evanescent field of the microresonator 12. For example, the housing 17 can be a DIP package, epoxy, a sealed container, or a silicon substrate having been doped to form the first waveguide 10 and the microresonator 12.

Figure 2:
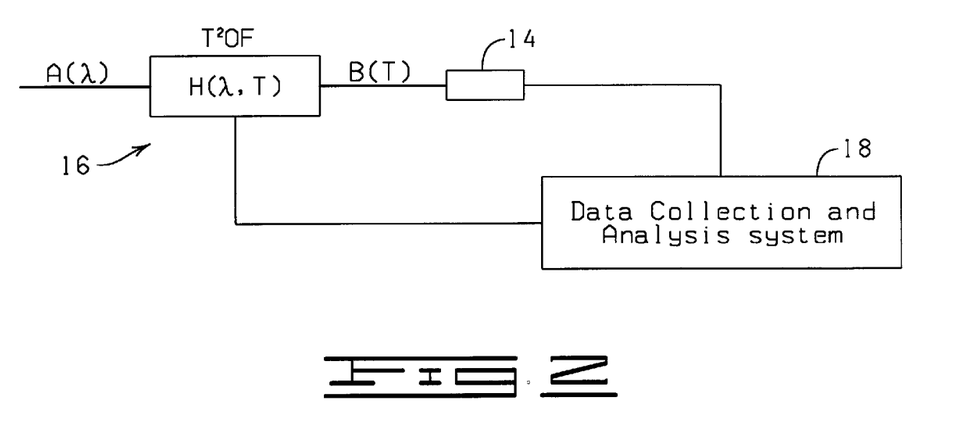
FIG. 2 is a block diagram of a spectrometer constructed in accordance with the present invention.

The data collection and analysis system 18 repeatably sweeps a predefined range of the environment used to alter the WGM's of the TOF 16 while monitoring the output of the filter, $B(T)$, using the detector 14 shown in FIG. 2. If the transfer function, $H(\lambda, T)$, of the TOF 16 has been determined, then the spectrum of the input signal, $A(\lambda)$, may be determined by using the equation $A(\lambda)=H^{-1}(\lambda, T)B(T)$. If the microresonator 12 is an eccentric spheroid and the first waveguide 10 is a tapered optical fiber, the filter 16 essentially forms an array of co-located optical cavities receiving the optical signal simultaneously due to coupling of off axis modes. The transfer function $H(\lambda, T)$ is based on a sum of the outputs of all of the optical cavities formed by the microresonator 12 and is therefore a complex transfer function. If these off-axis modes are eliminated by proper design, the transfer function is simplified and resembles that of a Fabry-Perot cavity.

The transfer function $H(\lambda, T)$ can be determined by a calibration procedure where a known optical signal is transmitted through the first waveguide 10 while simultaneously sweeping the TOF 16 with the data collection and analysis system 18. The data collection and analysis system 18 thus collects information which can be used to determine the transfer function $H(\lambda, T)$ using conventional methods. This procedure is then repeated for all of the wavelengths of light of interest. If it is determined that the transfer function H(λ, T) changes smoothly then the calibration procedure need only be conducted for various wavelengths of light and an interpolation algorithm can be used to determine the function in between.

Figure 3:
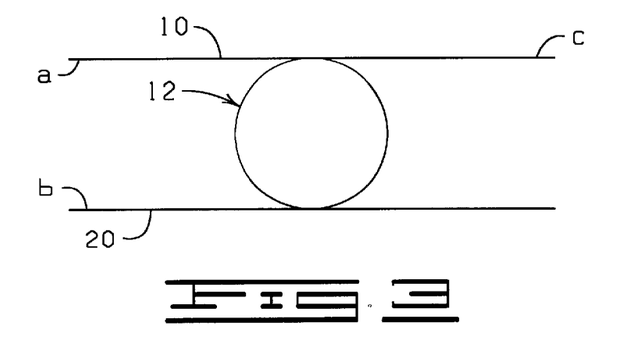
FIG. 3 is a diagrammatic view of a microresonator positioned in close proximity to an input optical waveguide and an output optical waveguide in accordance with the present invention.
Figure 4A:
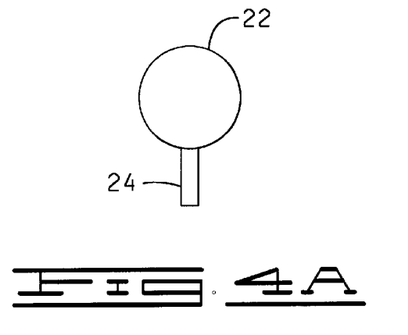
FIGS. 4a–4e show examples of various manners in which the microresonators of FIGS. 1 and 3 can be implemented.
Figure 4B:
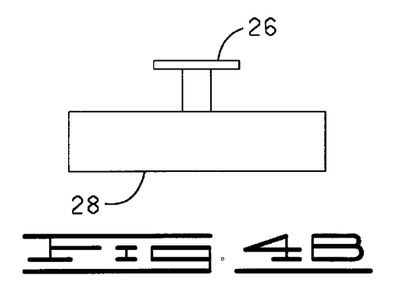
Figure 4C:
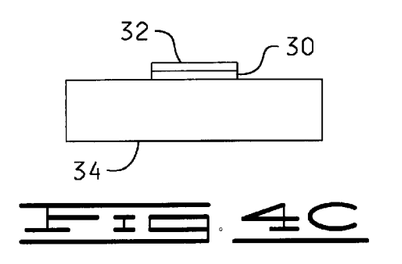
Figure 4D:
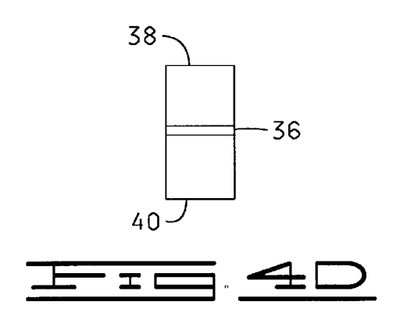
Figure 4E:
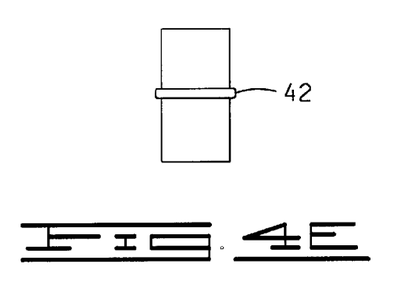

FIG. 3 shows an example illustrating an alternative implementation of the device. In this implementation, the optical signal is input into the first waveguide 10 at the point a traveling to the right and outcoupled by the microresonator 12 to a second waveguide 20 where it passes point b traveling to the left. The signal at point c is identical to that in the previous implementation, but the output at point b now contains only those wavelengths resonant with the microresonator's WGMs—rather than the input signal with WGM-resonant wavelengths removed. This gives the signal at point b a much higher signal to noise ratio than the signal at point c. When the second waveguide 20 is utilized, the housing 17 also encases a portion of the second waveguide 20 receiving light from the microresonator 12.

Coupling to and from the microresonator 12 may be accomplished, for example, by optical fibers (i.e., the first waveguide 10 and the second waveguide 20) fabricated by stretching, abrading, polishing, etching, or other means that provide access to the evanescent field of the light which the first waveguide 10 and the second waveguide 20 conduct. Coupling to and from the microresonator 12 could also be accomplished, for example, by using prisms to provide the momentum and frequency conservation conditions requisite for coupling. The distance d between the first waveguide 10 and the microresonator 12 can vary widely so long as the optical signal can couple out of the input first waveguide 10 and into the microresonator 12. The distance between the first waveguide 10 and the microresonator 12 is desirably between 10 µm or less. Desirably the first waveguide 10 is in physical contact with the microresonator 12 (distance d=0) to provide a more stable output signal. The distance between the optical waveguide 20 and the microresonator 12 can be the same as the distance d.

The microresonator 12 may also take a number of physical forms, including spheres, discs, rings, or cylinders of silica (or other material which is transparent in the wavelength range of interest). The construction of microresonators, such as the microresonator 12 is known in the art. For example, the microresonator 12 can be constructed by heating silica to the melting point to form a microsphere. Shown in FIGS. 4a–e, are various other embodiments of the microresonator 12. For example, as shown in FIGS. 4a–e, the microresonator 12 can be formed as 1) a microsphere 22 manufactured from a fiber stem 24, 2) a disc 26 supported by a substrate 28 by Micro-Electro-Mechanical Systems (MEMS) technology, 3) a low index layer 30 positioned between a high index disc 32 and a substrate 34 using photolithographic technology, 4) a cylinder or optical fiber having a high index disc 36 positioned between a pair of low index regions 38 and 40 by etching, deposition, or refractive index variation, or 5) a microdisc 42 formed in or on optical fiber by removing or adding material. The diameters of such spheres, discs or cylinders may range to 5 mm or greater, but would typically be between 5 and 1000 µm.

It should be understood that the invention can be used in any system where it is desirable to determine the wavelengths in an optical signal. For example, because of the high spectral resolution obtainable through this invention, it may be used in optical spectrum analyzers for wavelength division multiplexing (WDM) applications and as a WDM channel monitor. Development of fieldable spectrometers in the visible and near-infrared is also expected to benefit from the lack of moving parts and the ease of maintaining optical alignment. Optical spectrum analyzers, WDM applications and WDM channel monitors are well known in the art as is their use and method of operation and a detailed description of the use and method of operation of same is not deemed necessary to enable one skilled in the art to use the present invention in such systems.

Parallel use of two or more TOFs would permit the examination of broader wavelength ranges by lifting degenerate responses and eliminating uncertainties in the original input spectrum extraction process.

The tuned optical filter 16 alters the resonance modes of the filter by varying the physical properties of the microresonator 12. For example, the tuned optical filter 16 can be tuned by 1) varying the temperature of the microresonator 12, 2) axially compressing the microresonator 12 (in the case of spherical or cylindrical microresonators 12), 3) axially tensioning the microresonator 12 (in the case of cylindrical microresonators) to effect transfer-function tuning through dimensional deformation of the resonator 12.

The following examples of the invention are set forth hereinafter. It is to be understood that the examples are for illustrative purposes only and are not to be construed as limiting the scope of the invention as described and claimed herein.

EXAMPLE 1

Figure 5:
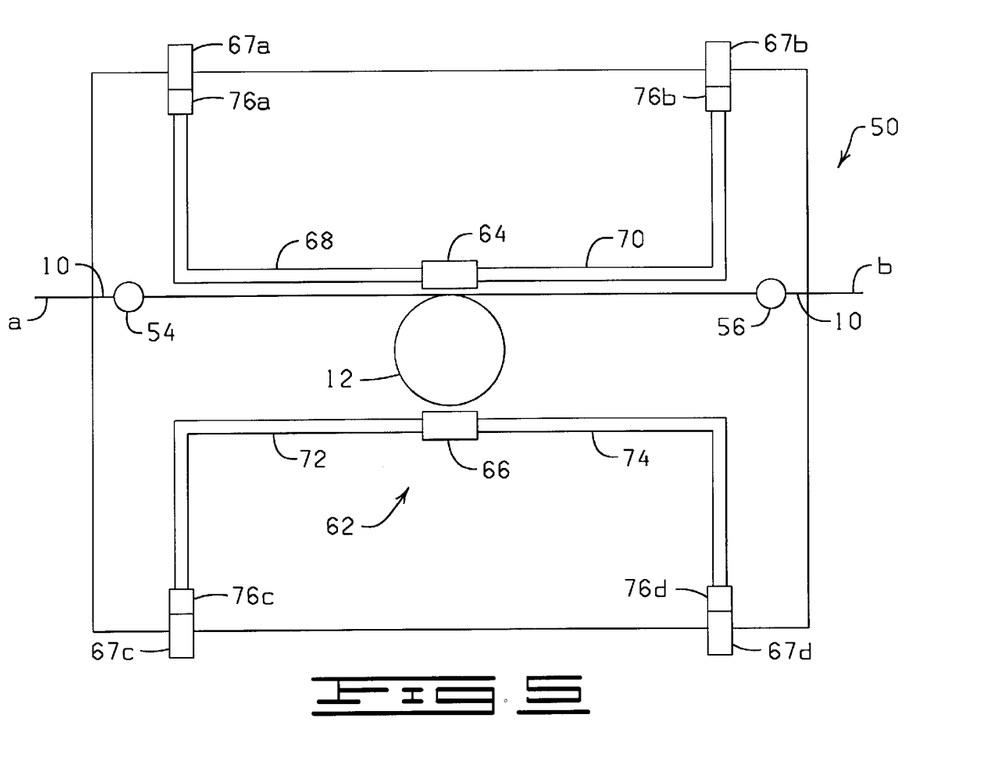
FIG. 5 is a top plan view of a temperature-tuned optical filter constructed in accordance with the present invention.
Figure 6:
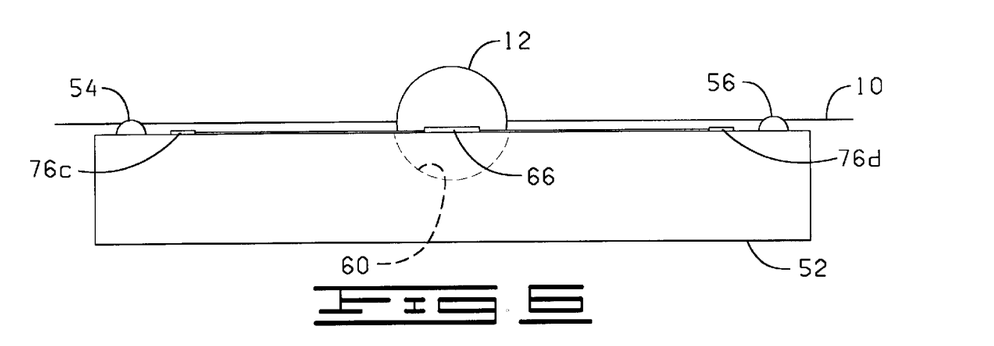
FIG. 6 is a side elevational view of the temperature-tuned optical filter depicted in FIG. 5.

Referring to FIGS. 5 and 6, shown therein and designated by the reference numeral 50 is a temperature-tuned optical filter constructed in accordance with the present invention which alters the resonance modes of the filter by local temperature variations.

The temperature-tuned optical filter 50 is provided with the input first waveguide 10 in close proximity to the microresonator 12. The optical wave guide 10 and the microresonator 12 are secured to a substrate 52. For example, the optical wave guide 10 can be secured to the substrate 52 via two or more bonds 54 and 56 formed by a bonding material, such as adhesive epoxy or ultra-violet light curable adhesive. When the microresonator 12 is a sphere, the microresonator 12 can be mounted in a depression 60 formed in the substrate 52. To control the temperature of the microresonator 12, the temperature-tuned optical filter 50 is provided with a temperature tuner 62 including a temperature measurement device 64 and a heat generator 66 positioned in close proximity, i.e., within about 20 µm to about 1000 µm, to the microresonator 12.

When the temperature-tuned optical filter 50 is provided in a DIP-package, the temperature measurement device 64 and the heat generator 66 are connected to pins 67a–d via electrical traces 68, 70, 72 and 74 formed on the substrate 52. The heat generator 66 receives periodic input signals from the data collection and analysis system 18 to cause the heat generator 54 to change or vary the temperature of the microresonator 12 in a predetermined manner. The heat generator 54 can be a resistor, or a heat generating optical lamp. The temperature measurement device 52 monitors the temperature of the microresonator 12 and provides feedback to the data collection and analysis system 18 regarding the temperature of the microresonator 12. The temperature measurement device 52 can be a thermistor or other device capable of sensing the temperature of the microresonator 12.

Thus, in one possible implementation the optical wave guide 10, e.g., a thinned optical fiber, held in place by flattened drops of epoxy, interacts with the microresonator 12, e.g., a microsphere, held in the depression in the substrate 52, e.g., a silicon substrate. The temperature measurement device 64, e.g., a thermistor element to the left of the microsphere monitors microsphere temperature, and the heat generator 66, e.g., a heating element near the microsphere, provides temperature control. The electrical traces 68, 70, 72 and 74 connect these elements to bonding pads 76a–d located around the perimeter of the silicon chip. After packaging, the device, i.e. the temperature-tuned optical filter 50 includes ports a and b extending as optical fiber, for example. Electrical contacts are provided by the pins 67a–d. In one embodiment (not shown), the temperature measurement device 64 and the heat generator 66 can be implemented as a thermoelectric cooler to both heat and measure the temperature of the microresonator 12.

EXAMPLE 2

Figure 7:
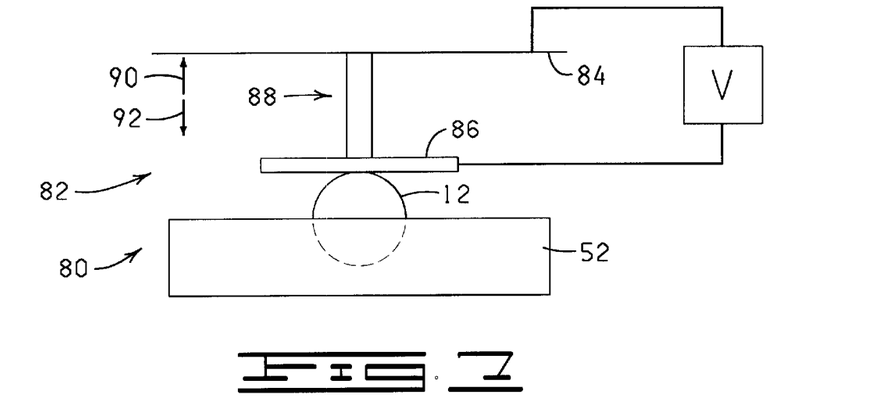
FIG. 7 is a side-elevational view of a compression-tuned optical filter constructed in accordance with the present invention.

Referring to FIG. 7, shown therein and designated by a reference numeral 80 is a compression-tuned optical filter constructed in accordance with the present invention (the first waveguide 10 has been removed from FIG. 7 for purposes of clarity). The compression-tuned optical filter 80 is made and used in a similar manner as the thermally-tuned optical filter 50, except that the temperature tuner 62 is eliminated and a compression tuner 82 is substituted therefor. The compression tuner 82 controls a compressive force applied against the microresonator 12. The compressive force applied against the microresonator 12 deforms the microresonator 12 and thus physically controls the resonance of the microresonator 12. The compression tuner 82 will be described herein as a piezoelectric positioning system however other manners, such as a solenoid or a hydraulic system for controlling the compression on the microresonator 12 could be used. The compression tuner 82 is provided with a support plate 84 spaced a fixed distance from the substrate 52, and a movable plate 86 positioned between the conducting support plate 84 and the substrate 52. The movable plate 86 is suspended from the support plate 84 by a piezoelectric material 88, such as quartz, tourmaline, Rochelle salt, polycrystalline ferroelectric ceramic materials such as BaTiO3 and Lead Zirconate Titanate (PZT). The movable plate 86 is at least partially constructed of a conductive material and is movable in linear directions 90 and 92 generally toward and away from the microresonator 12 by controlling the magnitude of a voltage placed across the conducting support plate 84 and the movable plate 86 to create an electromagnetic field therebetween. Generally, the movable plate 86 is positioned against the microresonator 12 but not connected to the microresonator 12. However, it should be understood that the movable plate 86 can be connected to the microresonator 12 and in this instance the compression tuner 82 can also be used to apply a stretching or tensile force to the microresonator 12.

EXAMPLE 3

Figure 8:
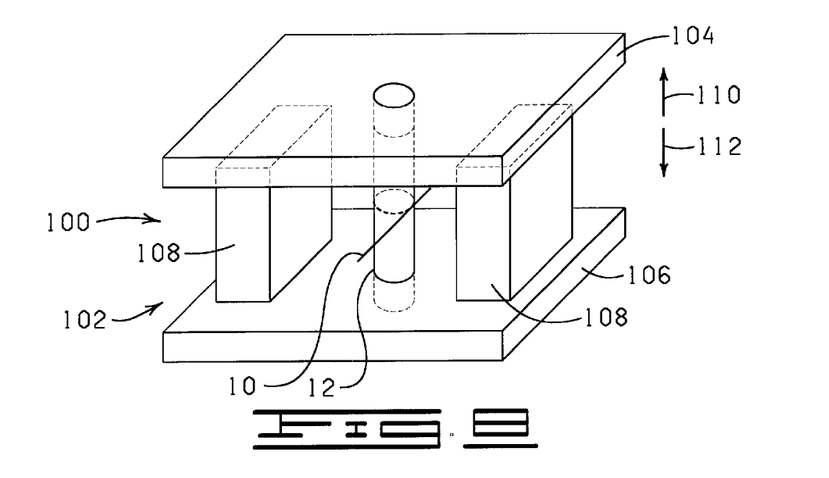
FIG. 8 is a perspective view of a tension-tuned optical filter constructed in accordance with the present invention.

Referring to FIG. 8, shown therein and designated by a reference numeral 100 is a tensile-tuned optical filter constructed in accordance with the present invention. The tensile-tuned optical filter 100 is made and used in a similar manner as the thermally-tuned optical filter 50, except that the temperature tuner 62 is eliminated and a tension tuner 102 is substituted therefor. The tension tuner 102 controls a tensile force applied to the microresonator 12 so as to cause or tend to cause an extension of the microresonator 12. The force applied to the microresonator 12 stretches the microresonator 12 and thus physically controls the resonance of the microresonator 12. The tension tuner 102 will be described herein as a piezoelectric positioning system however other manners, such as a solenoid or a hydraulic system for controlling the tension of the microresonator 12 could be used.

The tension tuner 102 is provided with a pair of spaced apart conducting plates 104 and 106. The microresonator 12 is positioned between the spaced apart conducting plates 104 and 106 and connected to both of the spaced apart conducting plates 104 and 106. The microresonator 12 does not have to be directly connected to the spaced apart conducting plates 104 and 106. Intermediary devices could be used if desired. One or more elongatable bar 108 is positioned between the spaced apart conducting plates 104 and 106 so as to maintain the conducting plates 104 and 106 a variable distance apart. In one embodiment, the tension tuner 102 includes two elongatable bars 108 which are constructed of a piezoelectric material, such as quartz, tourmaline, Rochelle salt, polycrystalline ferroelectric ceramic materials such as BaTiO3 and Lead Zirconate Titanate (PZT). The conducting plates 104 and 106 are movable in linear directions 110 and 112 generally toward and away from each other by controlling the magnitude of a voltage placed across the conducting plates 104 and 106 to create an electromagnetic field therebetween.

EXAMPLE 4

Figure 9:
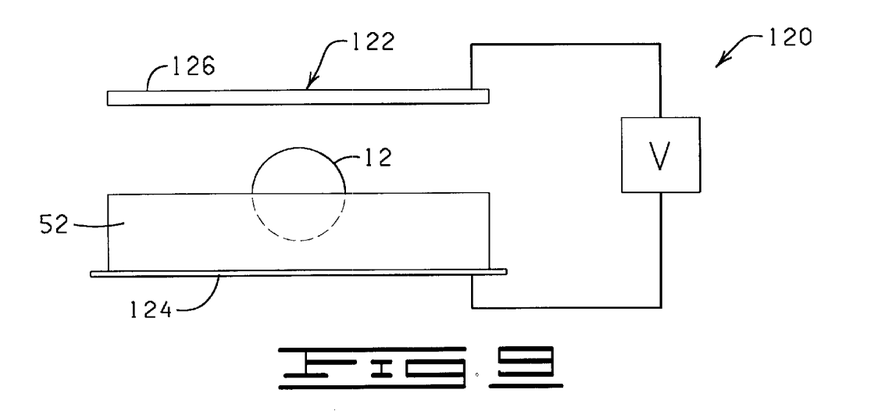
FIG. 9 is a side-elevational view of an electric field-tuned optical filter constructed in accordance with the present invention.

Referring to FIG. 9, shown therein and designated by a reference numeral 120 is an electromagnetic field-tuned optical filter constructed in accordance with the present invention (the first waveguide 10 has been removed from FIG. 9 for purposes of clarity). The electromagnetic field-tuned optical filter 120 is made and used in a similar manner as the thermally-tuned optical filter 50, except that the temperature tuner 62 is eliminated and an electric field tuner 122 is substituted therefor. The electric field tuner 122 controls an electric force applied to the microresonator 12 so as to cause or tend to cause an electro-optic effect in the microresonator 12 and change the optical pathlength of the microresonator 12.

The electric field tuner 122 is provided with a metallic contact 124 and an electrode 126. The metallic contact 124 is spaced a distance from the electrode 126. The substrate 52 and the microresonator 12 are positioned between the metallic contact 124 and the electrode 126. An electric field is placed across the metallic contact 124 and the electrode 126 to control an electric force applied to the microresonator 12 so as to cause or tend to cause an electro-optic effect in the microresonator 12 and change the optical pathlength of the microresonator 12. In this instance, the microresonator 12 is constructed of an electro-optic material. Examples of electro-optic materials include silica or a piezoelectric material coated with an optically transparent material, such as silica.

From the above description, it is clear that the present invention is well adapted to carry out the objects and to attain the advantages mentioned herein as well as those inherent in the invention. While presently preferred embodiments of the invention have been described for purposes of this disclosure, it will be readily understood that numerous changes may be made which will readily suggest themselves to those skilled in the art and which are accomplished within the spirit of the invention disclosed and set forth in the following claims.

What is claimed is:

1. An interferometric spectrometer comprising:
   a filtering device comprising:
   a microresonator having an optical pathlength and supporting whispering gallery modes, the optical pathlength of the microresonator being modifiable such that supported whispering gallery mode resonance frequencies are tunable;
   a first waveguide evanescently coupled to the microresonator such that supported whispering gallery mode resonance frequencies are extracted from the first waveguide and received into the microresonator while light at frequencies not resonant with the microresonator remain within the first waveguide;
   means for preventing optically absorptive or scattering materials from interacting with light in the evanescent field of the microresonator; andmeans for modifying the optical pathlength of the microresonator in a preselected manner;
   a photodetector detecting light within the first waveguide and generating output signals indicative of the light within the first waveguide; and
   a data collection and processing system outputting signals for controlling the means for modifying the optical pathlength of the microresonator and receiving signals from the photodector to calculate the spectrum of the light entering the first waveguide from the output of the photodetector.

2. The interferometric spectrometer of claim 1, wherein the means for modifying the optical pathlength of the microresonator includes means for applying compressive force to the microresonator thereby causing the physical dimension of the microresonator to distort or the refractive index of the microresonator material to change or both.

3. The interferometric spectrometer of claim 2, wherein the means for applying compressive force to the microresonator includes a piezoelectric positioning system having a movable plate contacting the microresonator.

4. The interferometric spectrometer of claim 1, wherein the means for modifying the optical pathlength of the microresonator includes means for applying tensile force to the microresonator thereby causing the physical dimension of the microresonator to distort or the refractive index of the microresonator material to change, or both.

5. The interferometric spectrometer of claim 4, wherein the means for applying tensile force to the microresonator includes a piezoelectric positioning system.

6. The interferometric spectrometer of claim 1, wherein the means for modifying the optical pathlength of the microresonator includes means for changing the temperature of the microresonator, causing the physical dimension of the microresonator to distort or the refractive index of the microresonator material to change, or both.

7. The interferometric spectrometer of claim 6, wherein the means for changing the temperature of the microresonator includes a heat generator positioned within about 20 $\mu$m to about 1000 $\mu$m of the microresonator, and a temperature measurement device positioned within about 20 $\mu$m to about 1000 $\mu$m of the microresonator.

8. The interferometric spectrometer of claim 1, further comprising a second waveguide evanescently coupled to the optical microresonator, such that light at frequencies resonant with the microresonator is extracted from the microresonator and into the second waveguide.

9. The interferometric spectrometer of claim 8, further comprising a detector positioned in close proximity to the second waveguide, the detector detecting the light conducted by the second waveguide and generating output signals indicative of the signal conducted by the second waveguide.

10. The interferometric spectrometer of claim 8, wherein the means for modifying the optical pathlength of the microresonator includes means for applying compressive force to the microresonator thereby causing the physical dimension of the microresonator to distort or the refractive index of the microresonator material to change, or both.

11. The interferometric spectrometer of claim 10, wherein the means for applying compressive force to the microresonator includes a piezoelectric positioning system having a movable plate contacting the microresonator.

12. The interferometric spectrometer of claim 8, wherein the means for modifying the optical pathlength of the microresonator includes means for applying tensile force to the microresonator thereby causing at least one of the physical dimension of the microresonator to distort and the refractive index of the microresonator material to change.

13. The interferometric spectrometer of claim 12, wherein the means for applying tensile force to the microresonator includes a piezoelectric positioning system.

14. The interferometric spectrometer of claim 8, wherein the means for modifying the optical pathlength of the microresonator includes means for changing the temperature of the microresonator, causing the physical dimension of the microresonator to distort or the refractive index of the microresonator material to change, or both.

15. The interferometric spectrometer of claim 14, wherein the means for changing the temperature of the microresonator includes a heat generator positioned within about 20 $\mu$m to about 1000 $\mu$m of the microresonator, and a temperature measurement device positioned within about 20 $\mu$m to about 1000 $\mu$m of the microresonator.

* * * * *

UNITED STATES PATENT AND TRADEMARK OFFICE
CERTIFICATE OF CORRECTION

PATENT NO.   : 6,661,950 B1
DATED        : December 9, 2003
INVENTOR(S)  : Brian N. Strecker It is certified that error appears in the above-identified patent and that said Letters Patent is hereby corrected as shown below:

Column 1,
Line 11, under "Statement Regarding Federally Sponsored Research or Development" add the following:
-- Microsphere-Based Optical Spectrum Analyzer, DMI-0091557, Project Advisor: Joel Roark, Nomadics, Inc., Program: SBIR. --

Column 7,
Line 17, after "microresonator" and before "for" separate the words "andmeans" to read -- and means --.

Column 8,
Line 34, after "physical" and before "of" add the letter -- s -- to "dimension".
Line 34, after "distort" and before "the" change to the word "and" to -- or --.
Line 35, after "change" add the words -- or both --.

Signed and Sealed this

Sixth Day of April, 2004

JON W. DUDAS
*Acting Director of the United States Patent and Trademark Office*